United States Patent

Lindquist

[11] Patent Number: 5,838,782
[45] Date of Patent: Nov. 17, 1998

[54] SYSTEM FOR CONVERTING A ROUTING ADDRESS WITHIN A TELECOMMUNICATIONS NETWORK

[75] Inventor: Jan E. Lindquist, Aachen, Germany

[73] Assignee: Ericsson, Inc., Research Triangle Park, N.C.

[21] Appl. No.: 653,266

[22] Filed: May 24, 1996

[51] Int. Cl.[6] .............................. H04M 7/00; H04M 3/42; H04J 3/02; H04J 3/12
[52] U.S. Cl. .......................... 379/230; 370/401; 370/467; 379/207; 379/219
[58] Field of Search .............................. 379/34, 207, 219, 379/220, 221, 229, 230; 370/401, 466, 467

[56] References Cited

U.S. PATENT DOCUMENTS

| | | | |
|---|---|---|---|
| 5,278,823 | 1/1994 | Handel | 370/401 X |
| 5,282,244 | 1/1994 | Fuller et al. | 379/207 X |
| 5,420,916 | 5/1995 | Sekiguchi | 379/230 |
| 5,506,894 | 4/1996 | Billings et al. | 379/230 X |
| 5,546,450 | 8/1996 | Suthard et al. | 379/34 X |
| 5,640,446 | 6/1997 | Everett et al. | 379/230 X |

FOREIGN PATENT DOCUMENTS

| | | |
|---|---|---|
| 0 203 614 | 12/1986 | European Pat. Off. . |
| 2 207 835 | 2/1989 | United Kingdom . |

OTHER PUBLICATIONS

El–Toumi, A.A., et al.; "Interconnecting SS7 Signaling Networks"; Apr. 15, 1990, vol. 2 of 4, pp. 589–593.

Bijan, Jabbari, "Routing and Congestion Control in Common Channel Signaling System No. 7", Apr. 1, 1992, vol. 80, No. 4, pp. 607–617.

Fergus, J.E., Signaling Network Interconnection, 1987, vol. 41, No. 1, pp. 560–562.

Nussbaumer, M., "Einführung des Zeichengabeverfahrens Nr. 7 nach CCITT in Österreich", Jun. 1, 1988 (no translation available).

*Primary Examiner*—Harry S. Hong
*Attorney, Agent, or Firm*—Jenkens & Gilchrist, P.C.

[57] ABSTRACT

A point code and subsystem number (PC/SSN) representing a first application layer node within a first Signaling System No. 7 (SS7) network is not defined within a second SS7 network. While transmitting a first signal from the first node to a second node within the second SS7 network, the PC/SSN representing the first node is utilized as the calling party address (Cgpa). A converter signal transfer point (STP) interfacing the first SS7 network with the second SS7 network intercepts the transmitted signal, converts the specified PC/SSN to a corresponding global title number. The first signal containing the converted Cgpa is then forwarded to the second node. Whenever the second node within the second SS7 network transmits a return signal back to the first node, the converted Cgpa is then used as the called party address (Cdpa). The converter STP once again intercepts the return address and converts the intercepted global title number back to the original PC/SSN value. The return signal with the converted Cdpa is then routed back to the first node.

21 Claims, 8 Drawing Sheets

5,838,782

SYSTEM FOR CONVERTING A ROUTING ADDRESS WITHIN A TELECOMMUNICATIONS NETWORK

RELATED APPLICATION

This application is related to U.S. application for patent Ser. No. 08/630,355, filed Apr. 10, 1996, titled "A Network Protocol Conversion Module Within A Telecommunications System" by Jan Lindquist et al.

BACKGROUND OF THE INVENTION

1. Technical Field of the Invention

The present invention relates to the communication of application layer signals across different telecommunications networks and, in particular, to the conversion of a point code and subsystem number within an application layer signal transmitted from a first Signaling System No. 7 (SS7) telecommunications network to a global title number routeable within a second SS7 telecommunications network.

2. Description of Related Art

A typical telecommunications exchange is a complex digital processor comprising a vast number of devices, signal terminals and, most importantly, software and hardware modules for providing telecommunications services to telecommunications users. With the development of the aforementioned digital processor and a Common Channel Signaling (CCS) network system, a typical telecommunications exchange is now able to support and transport much more than mere voice data. Such data might include video images, control signals, or application specific information. An example of such application specific information might be credit card validation data communicated over an existing telecommunications network to verify a customer's credit card number.

In order for two or more telecommunications exchanges to properly exchange data amongst each other, all parties to a "conversation" must agree to a specific communications protocol. The protocol must be strictly followed by each party to timely and correctly deliver data to the right place and to communicate recognizable data to end users engaged in a conversation or session over a network or series of networks. Consequently, in the modern telecommunications industry, standard communications systems are linked to each other using protocols based on the Open Systems Interconnections (OSI) model.

The OSI model is the only internationally accepted framework of standards for communicating between different systems made by different vendors. The goal of OSI is to create an open system networking environment where any vendor's computer system, connected to any network, can freely share data with any other computer system on that network. However, the fact that a system is "open" does not imply a particular protocol or specification. Rather, OSI provides a conceptual and functional framework which allows and supports users to develop their own telecommunications specifications to conform to more high level OSI layers. The most widely accepted OSI standard for telecommunications communications has been Common Channel Signaling (CCS). Particularly, the most commonly used technology for implementing CCS in the United States has been the Signaling System No. 7 (SS7). It should be noted however that even within the same SS7 telecommunications protocol, there are different mechanisms for transporting signals from an originating node to a destination node.

There are basically two different ways for routing a signal within a SS7 network. First, the routing can be based on a combination of a point code (PC) and a subsystem number (SSN, hereinafter collectively referred to as a PC/SSN). When a PC/SSN is provided for a signal, each participating node (such as a signal transfer point, STP) within the serving network must have data defining the specified PC/SSN. Therefore, whenever a signal is received with a particular PC/SSN, each transferring node within the serving network knows exactly where and whom to send the signal.

As an alternative, signals can be also routed using global title numbers. When the node originating the signal does not know the PC/SSN associated with the destination node, a global title number has to be used for routing purposes. Each transfer node connecting the originating node with the destination node only knows to forward the received signal with a particular global title number toward a certain network or direction. At some point, a correct PC/SSN has to be provided so the signal can reach its final destination. This function is known as global title translation and is usually performed by the STP adjacent to the destination node. Since all other intermediate nodes other than the adjacent STP merely forward the signal to the right direction, unlike a network utilizing PC/SSNs, the intermediate transferring nodes do not have to contain data defining the destination node indicated by the received global title number.

If a PC/SSN associated with a particular node within an SS7 network is defined throughout the SS7 network (all participating nodes within the SS7 network have data correlating the PC/SSN with the particular node), it is much more efficient and direct to route the signal using the defined PC/SSN. A signal transmitted by an originating node will be routed directly to the specified destination node since all intermediate nodes connecting the originating node with the destination nodes know where and how to forward the signal. However, if the PC/SSN is not defined throughout the SS7 network, then the signal must be routed using a global title number until it reaches a particular transfer node containing the relevant PC/SSN defining data. Such global title translation is inefficient and slows the routing of the signal.

When a signal is communicated from a first node within a first SS7 network to a second node within a second SS7 network, the PC/SSN associated with the first node is included in the signal as the called party address (Cdpa). Such called party address is later utilized by the second node within the second SS7 network to return a signal back to the first node. However, unless all intermediate nodes within the second SS7 network are defined with the PC/SSN value representing the first node, such a routing over the second SS7 network is not possible. On the other hand, it is not efficient for the first node to always transmit all its signals using global title numbers as the called party address because it slows the signal routing and mandates further processing time from each intermediate node within the first SS7 network.

Accordingly, it would be advantageous to provide a conversion system to route a signal transmitted with a PC/SSN over an SS7 network that does not have the specified PC/SSN defined.

SUMMARY OF THE INVENTION

The present invention discloses a method and apparatus for converting a point code and subsystem number (PC/SSN) representing a calling party address for a particular signal into a corresponding global title number to enable the signal to be transported over a Signaling System No. 7 (SS7) network that does not have the particular PC/SSN defined.

A converter signal transfer point (STP) connecting a first SS7 with a second SS7 network converts the PC/SSN representing the calling party address within the received signal to the corresponding global title number. The converted global title number represents the first node within the first SS7 network originating the signal, and when a return signal is later received by the converter STP using the converted global title number as the called party address, the converter STP again converts the global title address into the original PC/SSN. The converter STP then transmits the return signal using the PC/SSN as the called party address to the first node.

In another embodiment, the global title number converted by the converter STP represents the converter STP instead of the first node within the first SS7 network. Whenever the received signal is converted and transmitted by the converter STP, the received PC/SSN is further encapsulated into one of the optional Signaling Connection Control Part (SCCP) parameters within the transmitted signal. When a return signal using the converted global title number as the called party number and further encapsulating the original PC/SSN is later received by the converter STP, the converter STP extracts the encapsulated PC/SSN, and forwards the return signal using the extracted PC/SSN as the called party address to the first node.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
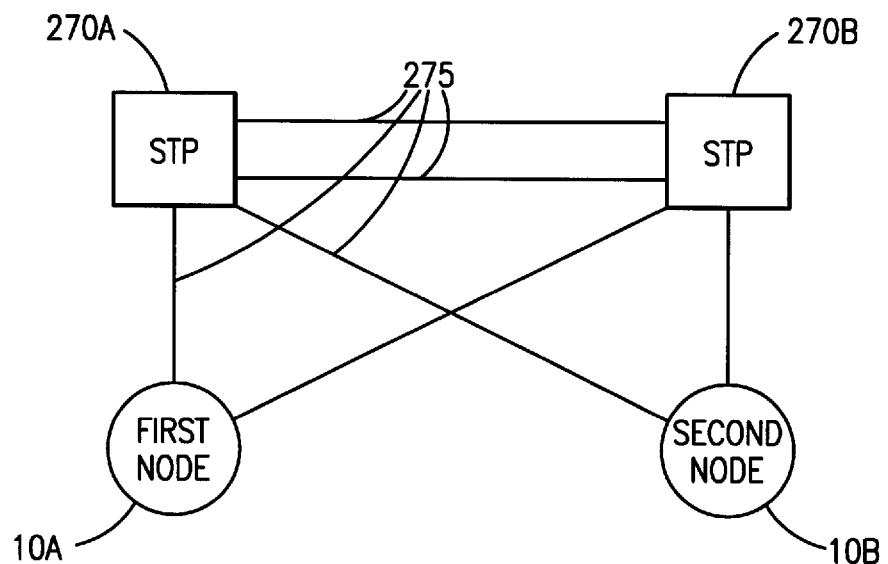
FIG. 1 is a block diagram illustrating a typical Signaling System No. 7 (SS7) telecommunications network.

FIG. 1 is a diagram representing a section of a typical Signaling System No. 7 telecommunications network in which the present invention may be implemented. With the advent of digital switching, Common Channel Signaling (CCS) has rapidly become the preferred way of handling the connection of calls in circuit-switched networks. The most commonly used technology for implementing CCS in the U.S. has been the Signaling System No. 7 (SS7) initially created by the Consultative Committee on International Telephone & Telegraph (CCITT) and later modified by the American National Standards Institute (ANSI). To carry out the routing and signaling functions within the network, messages must be sent via a packet-switched signaling network from a first node 10A such as a local exchange A to a second node 10B. Dual Signal Transfer Points (STPs) 270A and 270B are designed to provide reliable transfer of signaling messages by always providing more than one signal link 275 between any two nodes. These signals containing application layer data are transported within a network or series of networks without establishing a physical connection between an origination node and a destination node (a node may comprise a local exchange, database, or any other signal generating elements connected as part of a telecommunications network). Unlike the channel carrying voice data, each separate packet is individually and separately routed toward its destination node. Accordingly, each signal includes origination and destination addresses which direct the STPs to correctly deliver the packet to the destination node. Data required by application layer modules, such as credit card validation procedures or the Class Automatic Callback feature, are encapsulated into Transaction Capable Application Part (TCAP) message signals or other application layer signals and transported from one node in the network toward another node in the network. More specifically, Signaling Connection Control Part (SCCP) parameters within each signal header are filled with the necessary origination and destination addresses to enable the signal to travel across a network or a series of networks.

Figure 2:
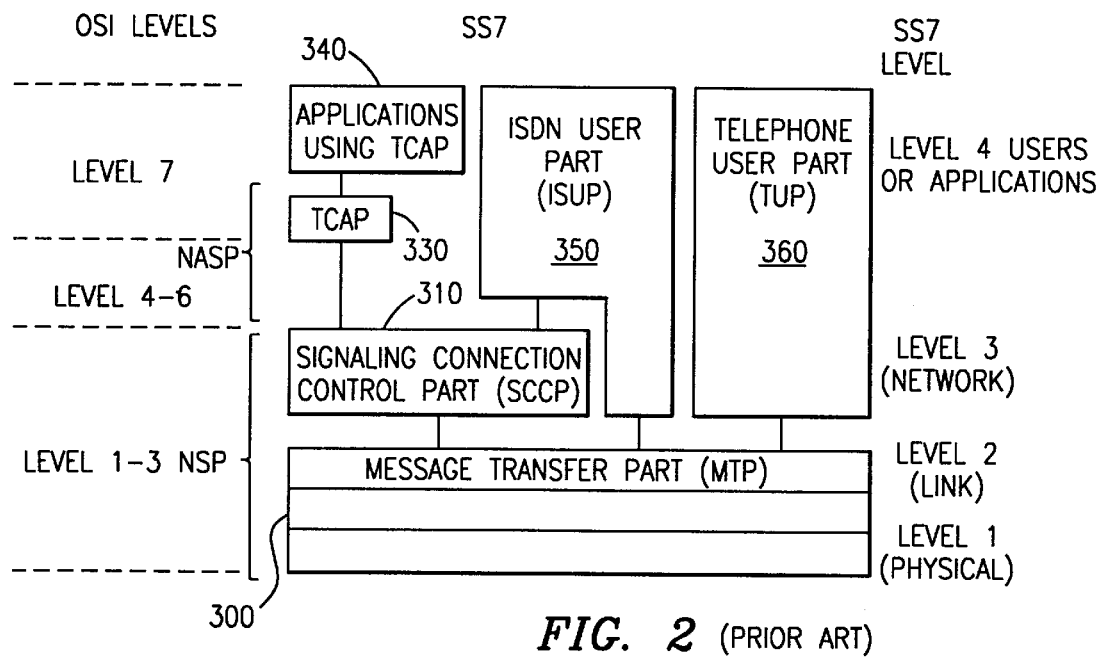
FIG. 2 is a block diagram illustrating the different layers within the SS7 telecommunications system.

FIG. 2 is a block diagram illustrating the different layers within a typical SS7 telecommunications system. In accordance with the layer architecture of the Open System Interface (OSI), an SS7 telecommunications system is also layered into multiple system layers. Basically, SS7 has two parts, a user part and a message transfer part. The message transfer part (MTP) 300 is the lowest layer of the SS7 network system and is used to transport data physically from one point to another point in the network. The user part comes in several varieties. Examples of such user parts include a Telephone User Part (TUP) 360 for basic telephone service, and an Integrated Service Digital Network (ISDN) User Part (ISUP) 350 for combined voice, data and voice services. These user parts also utilize the MTP 300 to provide a connection-less but sequenced transport service. Applications 340 residing at the very highest layer of an SS7 network utilize the Transaction Capabilities Application Part (TCAP) layer 330, and the Signaling Connection Control Part (SCCP) layer 310 to transport application layer data from one application to another application via MTP 300. Applications can further utilize their own proprietary message signals to interface directly with the SCCP layer 310 to communicate application layer data from one application to another application.

The purpose of the SCCP 310 is to provide the means for end-to-end routing. Accordingly, SCCP 310 processes the specified address within a particular signal to properly deliver the data to the specified destination. This addressing information is used at each signaling point, such as a Signaling Transfer Point (STP), by the MTP 300 to determine which communication link to use.

Figure 3:
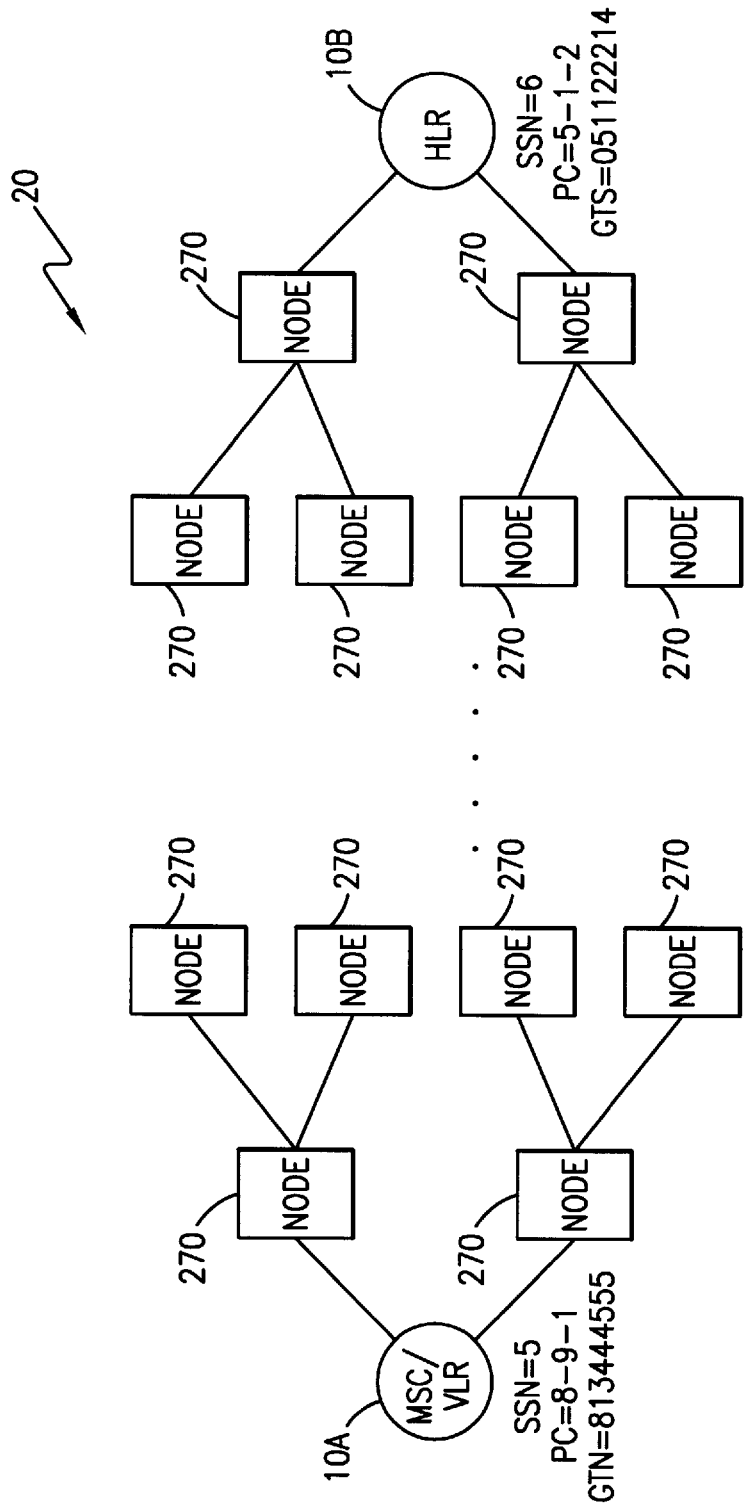
FIG. 3 is a network architecture representing a typical SS7 telecommunications network connecting a originating node with a destination node.

FIG. 3 is a network architecture representing a typical SS7 telecommunications network connecting a first node, such as a mobile switching center/visitor location register (MSC/

VLR) 10A with a destination node, such as a home location register (HLR) 20B. Using a mobile telecommunications system as an illustration, whenever a mobile station travels into a new MSC/VLR area, the serving MSC/VLR 10A communicates with the HLR 10B associated with the mobile station to inform the HLR 10B of the current location of the mobile station. If the mobile station is currently located away from his home Public Land Mobile Network (PLMN), the serving MSC/VLR 10A could be a node connected to a different SS7 network than the one connecting the home HLR 10B. The MSC/VLR 10A then communicates with the home HLR 10B via a multitude of intermediate nodes 270 connecting the MSC/VLR 10A with the HLR 10B. The called party address within a signal transmitted by the MSC/VLR 10A must enable the intermediate nodes to recognize the HLR 10B as the destination node and accordingly forward the transmitted signal to the correct destination. In order to properly facilitate the delivery of a return signal back from the second node to the first node, the calling party address specified by the MSC/VLR 10A must further enable the intermediate nodes to later transport a signal over the second SS7 network.

There are basically two different ways for routing a signal within an SS7 network. First, the signal routing can be based on a combination of a point code (PC) and a subsystem number (SSN, hereinafter collectively referred to as a PC/SSN). As an alternative, a signal can also be routed using a global title number. Even though utilizing a PC/SSN is the most direct and efficient way to route a signal, not all SS7 networks can route signals utilizing a particular PC/SSN.

Figure 4:
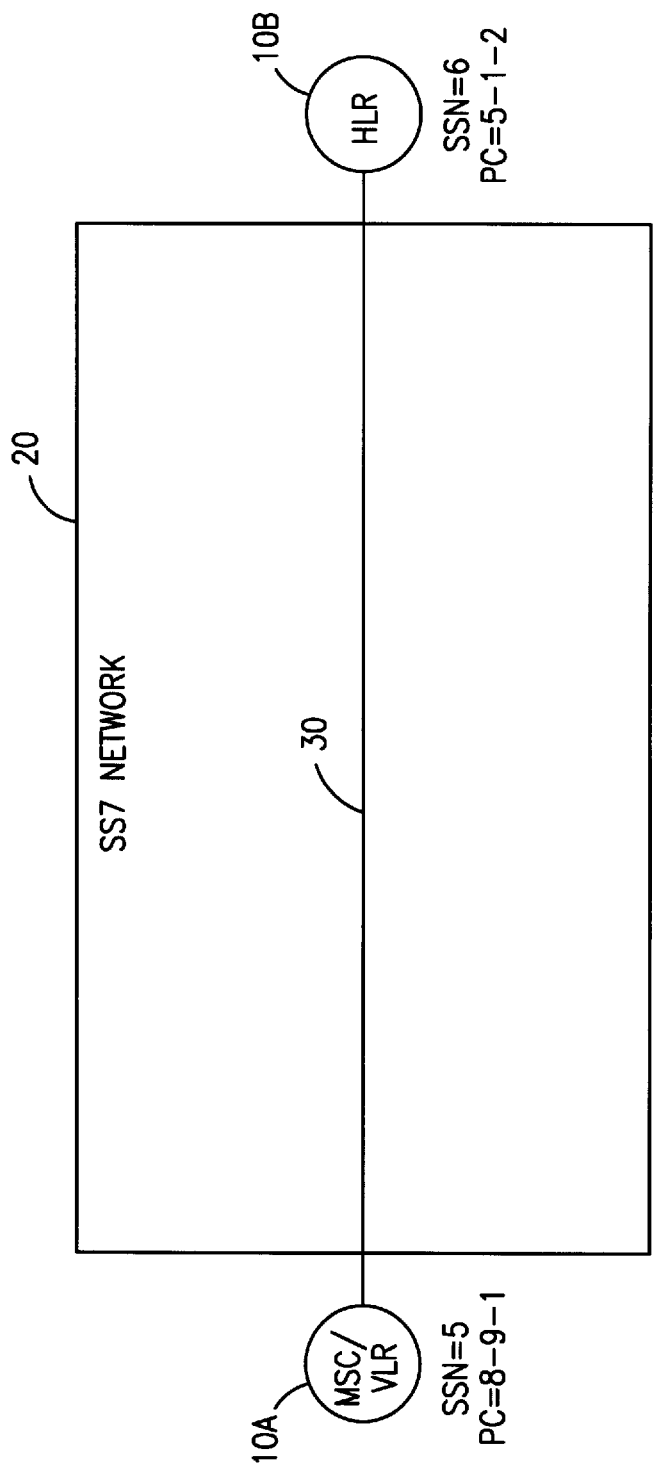
FIG. 4 is a block diagram illustrating a logical routing path taken by a signal utilizing a point code and subsystem number as the addressing mechanism.

FIG. 4 is a block diagram illustrating a logical routing path taken by a signal over an SS7 network while utilizing a PC/SSN as the addressing mechanism. When a PC/SSN is provided as the called party address (Cdpa), every participating node (not shown in FIG. 4, see 270 in FIG. 3) connecting the originating node with the destination node within the serving SS7 network 20 must contain data defining the specified PC/SSN. Consequently, each intermediate participating node receiving the signal with the particular PC/SSN knows exactly how and where to forward the signal. Accordingly, assuming that all links are up and available, the logical path 30 illustrates the signal path taken by an SS7 network to communicate the signal between the serving MSC/VLR 10A and the home HLR 10B.

Even though routing via a particular PC/SSN is an effective and direct way of transporting a signal within an SS7 network, such a routing is not possible unless all participating intermediate nodes within that particular SS7 network contain data defining the particular PC/SSN. Usually, requiring a first SS7 network to define data identifying each origination and destination node within the first SS7 network is not a problem. However, requiring a first SS7 network to define data identifying every node connected to a second SS7 network is not always possible or desirable.

Figure 5:
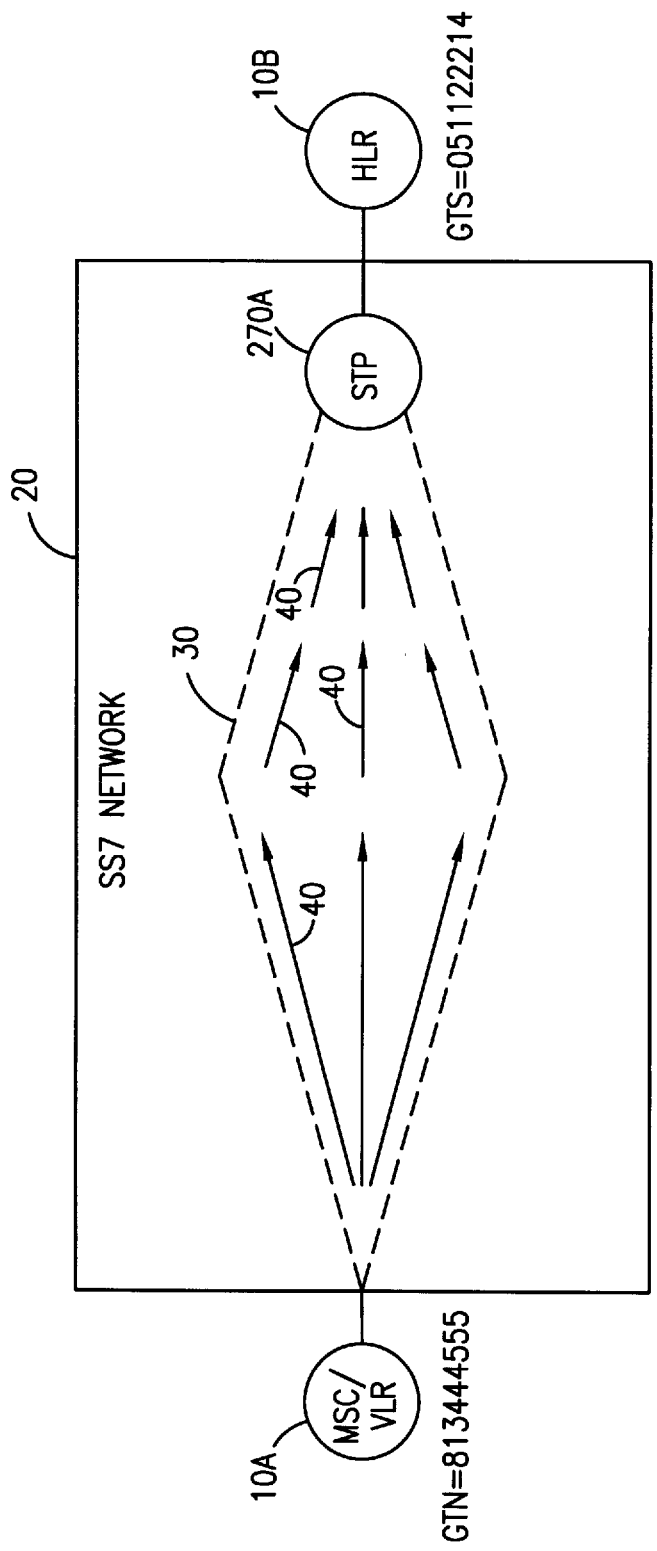
FIG. 5 is a block diagram illustrating possible routing paths taken by a signal utilizing a global title number as the addressing mechanism.

Alternatively, a signal can also be routed via a global title number. Accordingly, FIG. 5 is a block diagram illustrating possible routing paths taken by an SS7 network to communicate a signal utilizing a global title number. A global title number, such as a directory number dialed by a telecommunications subscriber, does not pinpoint exactly where the destination node is located. Each intermediate node (not shown in FIG. 5, see 270 in FIG. 3) within the serving SS7 network does not contain data correlating a particular global title number with a particular node. However, by analyzing a relevant portion of the received global title number, each intermediate node is at least able to forward the received signal to the right direction. For example, if a signal containing 214-555-1212 is received as the called party address by a signal transfer point (STP), the STP cannot determine the exact location of the specified destination node. However, by analyzing a portion of the global title number, such as the first three prefixes, the STP is able to ascertain that this signal needs to be forwarded to the Dallas, Tex. area. Once it reaches an STP within the Dallas, Tex. area, another STP then analyzes the next three digits to determine the appropriate sub-area within the Dallas, Tex. area. Eventually, it will reach an intermediate node, usually the adjacent STP connected to the final destination node, that recognizes the received global title number, translates the global title number to the corresponding PC/SSN, and forwards the signal to the final destination node.

Consequently, if the serving MSC/VLR 10A transmits a signal using a particular global title number representing the home HLR 10B as the called party address within the SS7 network 20, all possible routing paths within the serving SS7 network 20 are illustrated by logical paths 30. Instead of establishing a direct connection between the serving MSC/VLR 10A and the home HLR 10B, each intermediate node within the serving SS7 network 20 merely forwards the signal to the correct direction (as denoted by the logical direction arrows 40). At some point, the PC/SSN is provided and the signal is delivered to its final destination node. Compared to routing a signal via a PC/SSN, the signal routing utilizing a global title number is inefficient and cumbersome because each intermediate transferring node has to analyze the received global title number. However, for storage capacity and maintenance reasons, a first SS7 network usually does not store data defining an external node connected to another SS7 network. Accordingly, if a signal is transmitted towards an external node connected to another SS7 network, the global title number addressing mechanism is needed.

Figure 6:
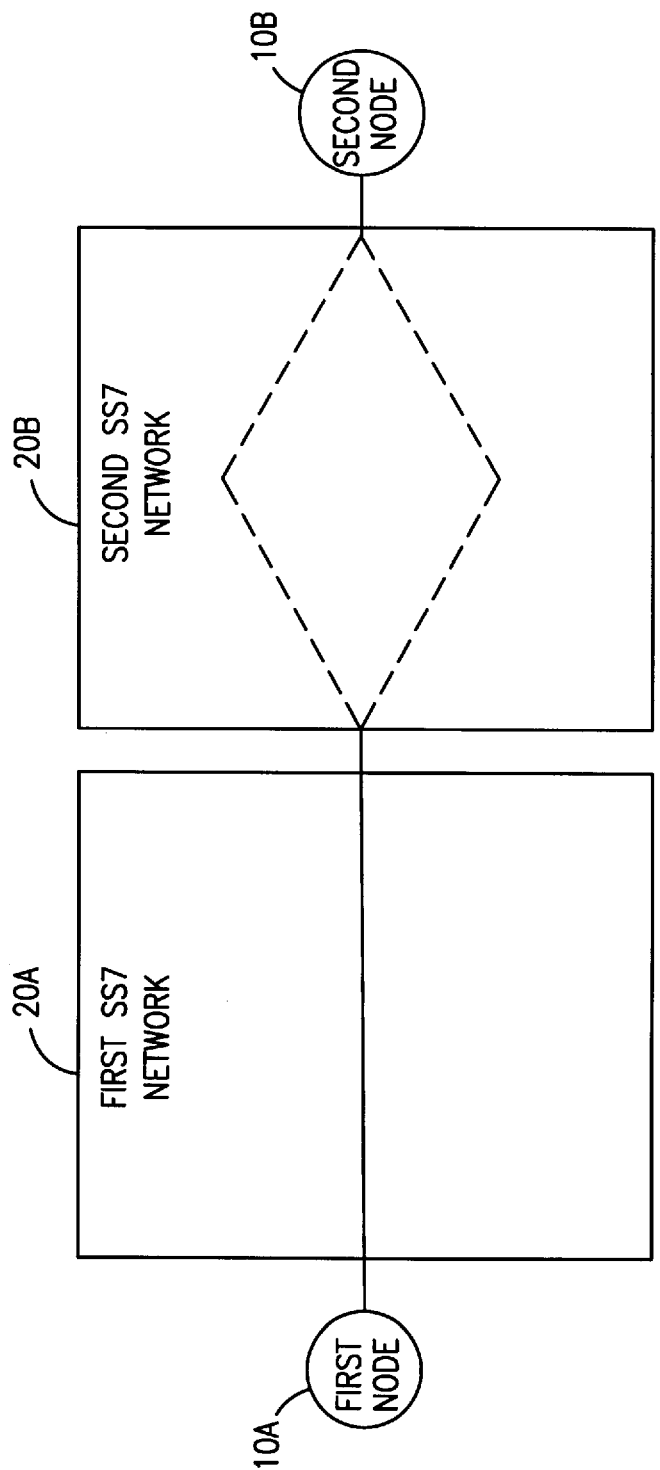
FIG. 6 is a block diagram illustrating the routing inconsistency that exists when a first SS7 network utilizing a PC/SSN is interfaced with a second SS7 network utilizing a global title number.

FIG. 6 is a block diagram illustrating the routing inconsistency that exists when a first SS7 network utilizing a PC/SSN is interfaced with a second SS7 network utilizing a global title number. The second SS7 network 20B does not contain data defining the PC/SSN associated with the first node 10A within the first SS7 network 10A. When the first node 10A within the first SS7 network transmits an application layer signal towards the second node 10B within the second SS7 network, the global title number representing the second node 10B is used as the called party number. However, in order to facilitate a proper delivery of a return signal back to the first node 10A, the signal transmitted by the first node 10A further contains its own PC/SSN as the calling party address. Since, global title numbers are routeable on both SS7 networks, the signal using the specified global title address as the called party address is properly routed from the first node 10A to the second node 10B. If the second node 10B wants to transmit a return signal back to the first node 10A in response to the receipt of the signal, the calling party address within the received signal is utilized as the called party address for the return signal. However, the called party address is a PC/SSN. Since intermediate transferring nodes within the second SS7 network 20B do not contain data defining the specified PC/SSN, the return address cannot be properly routed back to the first SS7 network 20A.

Accordingly, there is a need for a conversion system to convert the specified PC/SSN to a corresponding global title number to enable the first SS7 network to route the signal using the specified PC/SSN as the routing address and to enable the second SS7 network to route the same signal using the converted global title number as the routing address.

Figure 7:
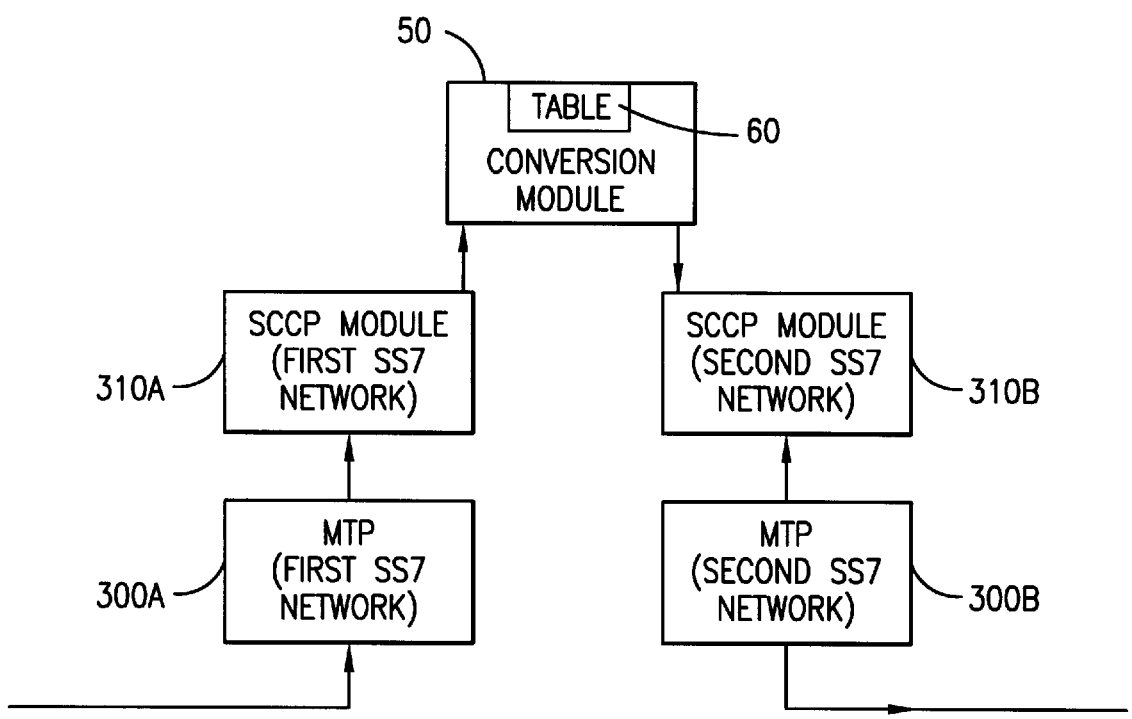
FIG. 7 is a block diagram illustrating a conversion module interfacing with Signaling Connection Control Part (SCCP) modules for converting the called party address within a signal communicated between the first and second SS7 telecommunications networks.

In accordance with the teachings of the present invention, FIG. 7 is a block diagram illustrating a conversion module interfacing with Signaling Connection Control Part (SCCP) modules for converting the called party address within a signal communicated between the first and second SS7 telecommunications networks. The first SS7 network MTP layer 300A physically transports the signal from the first SS7 network and interfaces with the first SS7 network SCCP module 310A. The first SCCP module 310A retrieves the signal from the first MTP layer 300A and forwards it to the conversion module 50. The conversion module 50, in response to the dynamic values stored in its conversion table or register 60, accordingly changes the received PC/SSN representing the originating node to the corresponding global title number. The signal with the converted calling party address SCCP parameters and still containing the same application layer data is then transmitted to the second SS7 network to be delivered to the destination application node. Accordingly, the converted signal is interfaced with the second SS7 network SCCP module 310B. The second SCCP module 310B in turn interfaces the signal with the second SS7 network MTP layer 300B for physical transportation to the destination node. The converted calling party address will later be used by the destination node to transmit a return signal back to the originating node.

During the overall conversion and interface process, only the SCCP layer data within the signal header are manipulated by the conversion module, and all other layer data including TCAP data are transported transparently through the conversion module.

Figure 8:
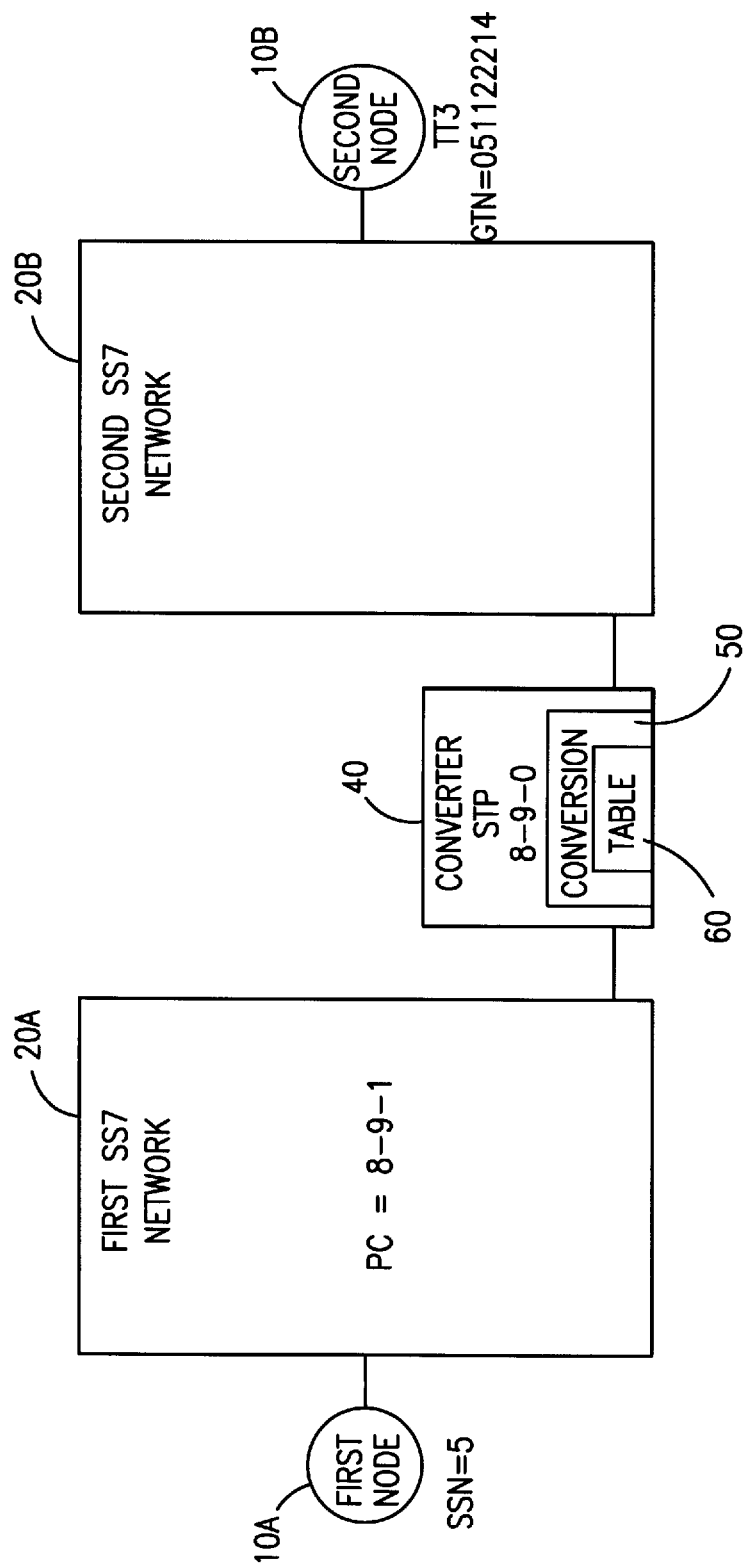
FIG. 8 is a block diagram illustrating a converter signal transfer point (STP) connecting a first SS7 network with a second SS7 network and converting a point code and subsystem number within the received signal to a corresponding global title number.

FIG. 8 is an exemplary embodiment of the present invention. A converter STP 40 connects a first SS7 network 20A with a second SS7 network 20B. For normal telephone service, including call setup and voice data communication, no converter is needed. For normal telephone connections, signals such as ISUP or TUP do not require SCCP parameters. However, application layer data encapsulated in a signal utilizing SCCP parameters, such as a Mobile Application Part (MAP) signal communicated between an MSC/VLR and an HLR, are intercepted and converted by the conversion module 50 residing within the converter STP 40. The signals are intercepted and forwarded to the conversion module 50 in accordance with the manner described in FIG. 7.

The conversion module 50 residing within the converter STP 40 converts the received PC/SSN value to the corresponding global title number by referencing a conversion table 60 storing global title numbers and their cross referencing pointers. An exemplary conversion table or register 60 comprises:

TABLE 1

| STANDARD LABEL | SCCP PARAMETER & VALUES |
|---|---|
| 1 SS7 | TT = 3 |
|  | *Other SCCP parameters |
| 2 SS7 | PC = 8-9-1 |
|  | SSN = 5 |
| 3 SS7 | TT = 0 |
|  | NP = 7 |
|  | NA = 4 |
|  | GTS = 8134445555 |
|  | (GTS identifying 8-9-1) |

Using the above entries, PC/SSN SCCP parameter values are further cross referenced and converted into corresponding global title numbers in accordance with Table 2:

TABLE 2

| FIRST SS7 | SECOND SS7 |
|---|---|
| 1 SS7 | 1 SS7 (No change) |
| 2 SS7 | 3 SS7 |

In FIG. 8, the first node 10A having an SSN value of 5 originates an application layer signal (first signal) while being connected to the first SS7 network 20A with a PC value of 8-9-1. Accordingly, the calling party address for the first signal is PC=8-9-1 and SSN=5. A user inputted called party address specifying the destination node also needs to be specified by the SCCP parameters to show, for example: TT=3; and global title number=051122214. Using the specified called party address in the global title number format, the first SS7 network 20A is able to route the first signal towards the converter STP 40. Once the first signal containing the above calling party address and called party address is received by the converter STP 40, the received calling party address and called party address are converted in accordance with above Tables 1 and 2.

For the called party address SCCP parameter values, since TT=3 corresponds to the 1 SS7 label, no conversion is performed as specified by the first row of Table 2. The conversion module 50 assumes that the called party address is already in the global title number format and no conversion needs to be performed. Since the called party address indicating the second node 10B within the second SS7 network 20B has been properly specified by the user, the first signal is transportable to the final destination.

The calling party address, on the other hand, is not utilized by the second SS7 network to deliver the first signal to the second node 10B. However, if the second node 10B subsequently wishes to return a message back to the first node 10A, the enclosed calling party address is used as the called party address for the new return signal. As described previously, because the specified PC/SSN representing the first node 10A within the first SS7 network 20A is not defined within the second SS7 network 20B, the routing of the return signal using the received PC/SSN as the called party address is not possible. Therefore, for purposes of facilitating the proper delivery of the result message back to the first node 10A, the conversion module 50, while transmitting the first signal to the second node 10B, converts the calling party address stored in the PC/SSN format to the corresponding global title number format in accordance with the teachings of the present invention.

The calling party address specified by the first node 10A comprises SSN=5 and PC=8-9-1. Since this particular PC/SSN is the 2 SS7 label, the SCCP parameter values are converted as specified by the second row of Table 2.

Accordingly, using Tables 1 and 2, the calling party address (Cgpa) and called party address (Cdpa) of the first signal are converted:

| from: | Cdpa: | TT = 3 | Cgpa: | PC = 8-9-1 |
|---|---|---|---|---|
|  |  | GTN = 051122214 |  | SSN = 5 |
| to: | Cdpa: | TT = 3 | Cgpa: | TT = 8 |
|  |  | GTN = 051122214 |  | GTN = 8134445555 |

Subsequently, when the second node 10B within the second SS7 network 20B transmits a return signal back to the first node 10A, the following SCCP called party address and calling party address are again transmitted by the second node 10B and received by the converter STP 40:

| Cgpa: | TT = 3 | Cdpa: | PC = 8-9-1 |
|---|---|---|---|
|  | GTN = 051122214 |  | SSN = 5 |

As enumerated above, the Cgpa and Cdpa SCCP parameter values for the first signal are swapped to comprise the Cdpa and Cgpa parameter values for the return signal. Using the converted global title number as the called party address, the return signal is properly routed from the second node 10B to the converter STP 40 over the second SS7 network 20B. Once the return signal is received by the conversion module 50, in order to facilitate a more direct signal transfer over the first SS7 network, the received called party address is converted back to the original PC/SSN SCCP parameter values by indexing the above Tables 1 and 2. Accordingly, the calling party address and called party address are converted to:

| Cdpa: | PC = 8-9-1 | Cgpa: | TT = 3 |
|---|---|---|---|
|  | SSN = 5 |  | GTS = 051122214 |

Using the reconverted called party address in the PC/SSN format, the converter STP 40 is able to transmit the return signal directly and efficiently to the first node 10A over the first SS7 network 20A.

As another embodiment of the present invention, in order to reduce the storage capacity required by the converter STP 40 to store all possible PC/SSN combinations with their corresponding global title numbers, the conversion module 50 within the converter STP 40 converts the PC/SSN SCCP parameter values within the received signal to the global title number representing the converter STP 40. By transmitting the first signal with the global title number representing the converter STP 40 as the calling party address, any subsequent return signals transmitted by the second node 10B will be routed back to the converter STP 40. While transmitting the first signal to the second node 10B, the PC/SSN SCCP parameter values received from the first node 10A as the calling party address are further encapsulated into optional SCCP parameters not utilized by the second SS7 network 20B. These optional parameters are not manipulated by the second node 10B and included on the return signal from the second node 10B. Accordingly, the original PC/SSN SCCP parameter values are "piggy backed" onto the first signal when transmitted from the converter STP 40 to the second node 10B. When the decision is made to transmit the return signal, the received PC/SSN SCCP parameter values are returned to the converter STP 40 by "piggybacked" onto the transmitted return signal. Once the "piggy-backed" PC/SSN values are received by the converter STP 40, instead of utilizing above Table 1 to perform the conversion, the encapsulated PC/SSN values are extracted from the return signal by the conversion module 50 and transmitted as the called party address over the first SS7 network.

By utilizing a global title number assigned to the converter STP 40 as the calling party address, the conversion module 50 does not have to internally store all possible combinations of PC/SSN values with corresponding global title numbers.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for communicating a signal between a first node within a first Signaling System No. 7 (SS7) network and a second node within a second SS7 network, wherein said first SS7 network and said second SS7 network are connected by a converter signal transfer point (STP), and wherein said signal includes a point code and subsystem number representing said first node as a calling party address, wherein said point code and subsystem number are routeable within said first SS7 network but not routeable within said second SS7 network, said method comprising the steps of:

receiving said signal from said first node by said converter signal transfer point (STP), said signal including said point code and subsystem number representing said first node as said calling party address (Cgpa);

converting said received point code and subsystem number into a global title number routeable within said second telecommunications network by said converter STP, and replacing said global title number in said signal as said calling party address, wherein said global title number represents said converter STP; and transmitting said signal from said converter STP towards said second node over said second SS7 network.

2. The method of claim 1 wherein said converter STP comprises an international gateway STP.

3. The method of claim 1 further comprising the step of storing said point code and subsystem number representing said first node in a memory attached to said converter STP.

4. The method of claim 1 further comprising the steps of:

receiving a return signal by said converter STP sent from said second node in response to said signal, said return signal transported over said second SS7 network using said global title number as a called party address;

converting said global title number into said point code and subsystem number representing said first node and replacing said point code and subsystem number as said called party address; and transmitting said return signal from said converter STP towards said first node over said first SS7 network.

5. The method of claim 4 wherein said step of converting further comprises the step of retrieving said point code and subsystem number representing said first node from a memory.

6. The method of claim 1 wherein said signal comprises a plurality of parameters and wherein said step of transmitting said signal further comprises the step of encapsulating said received point code and subsystem number within one of said plurality of parameters not being used by said second SS7 network.

7. The method of claim 6 further comprising the steps of:

receiving a return signal by said converter STP sent from said second node, said return signal transported over said second SS7 network using said global title number as a called party address and wherein said return signal further encapsulates said point code and subsystem number;

extracting said encapsulated point code and subsystem number from said return signal by said converter STP; and transmitting said return signal from said converter STP towards said first node over said first SS7 network using said extracted point code and subsystem number as said called party address.

8. A system for communicating a signal containing application layer data between a first node within a first signaling system No. 7 (SS7) network and a second node within a second SS7 network, wherein said signal includes a point code and subsystem number representing said first node as a Calling Party Address, wherein said point code and subsystem number are defined within said first SS7 network and wherein said point code and subsystem number are not defined within said second SS7 network, said system comprising:

a converter signal transfer point (STP) connecting said first SS7 network with said second SS7 network, said converter STP comprising:

a Signaling Connection Control Part (SCCP) layer module for receiving said signal from said first SS7 network; and a conversion module interfaced with said SCCP layer module, said conversion module converting said point code and subsystem number within said received signal to a global title number routeable by said second SS7 network, said global title number representing said converter STP.

9. The system of claim 8 further comprising a memory table for storing possible point code and subsystem numbers within said first SS7 network with corresponding global title numbers.

10. The system of claim 9
wherein said SCCP module receives a return signal from said second node, said return signal routed over said second SS7 network using said global title number as a called party address;
wherein said conversion module converts said global title number into said point code and subsystem number previously received within said signal; and
wherein said SCCP module transmits said return signal to said first node over said first SS7 network using said converted point code and subsystem number as said called party address.

11. The system of claim 8 further comprising a memory table for storing said point code subsystem number representing said first node.

12. The system of claim 11 wherein said SCCP module receives a return signal from said second node, said return signal routed over said second SS7 network using said global title number as a called party address;
wherein said conversion module retrieves said point code and subsystem number representing said first node from said memory table; and
wherein said SCCP module transmits said return signal to said first node over said SS7 network using said retrieved point code and subsystem number as said called party address.

13. The system of claim 8 wherein said signal comprises a plurality of parameters and said converter STP further comprises means for encapsulating said point code and subsystem number into one of said plurality of parameters not being used by said second SS7 network.

14. The system of claim 13
wherein said SCCP layer module receives a return signal from said second node, said return signal routed over said second SS7 network using said global title number as a called party address and further encapsulates said point code and subsystem number;
wherein said conversion module extracts said encapsulated point code and subsystem number from said return signal; and wherein said SCCP layer module transmits said return signal towards said first node using said extracted point code and subsystem number as said called party number.

15. A system for communicating a signal between a first node within a first Signaling System No. 7 (SS7) network to a second node within a second SS7 network, wherein said first node is identified by a point code and subsystem number and wherein said first SS7 network is capable of routing said signal utilizing said point code and subsystem number and wherein said second SS7 said point code and subsystem number, said system comprising:

a converter Signal Transfer Point connecting said first SS7 network to said second SS7 network, said converter STP comprising:

means for receiving a signal from said first node, said signal including said point code and subsystem number representing said first node as a calling party address;

means for converting said point code and subsystem number into a global title number representing said converter STP; and means for transmitting said signal to said second node over said second SS7 network.

16. The system of claim 15 wherein said converter STP comprises an international gateway STP.

17. The system of claim 15 wherein said converter STP further comprises a memory for storing said point code and subsystem number representing said first node.

18. The system of claim 15 wherein said converter STP further comprises:

means for receiving a return signal from said second node, said return signal routed over said second SS7 network using said global title number as a called party address;

means for converting said global title number back into said point code and subsystem number previously received within said signal; and means for transmitting said return signal to said first node over said first SS7 network using said point code and subsystem number as said called party address.

19. The system of claim 18 wherein said converter STP further comprises means for retrieving said point code and subsystem number previously received within said signal from a memory.

20. The system of claim 15 wherein said signal comprise a plurality of parameters and said converter STP further comprising means for encapsulating said received point code and subsystem number within one said plurality of parameters not being used by said second SS7 network.

21. The system of claim 20 wherein said converter STP further comprises:

means for receiving a return signal from said second node, said return signal transported over said second SS7 network using said global title number as a called party address and wherein said return signal further encapsulates said point code and subsystem number;

means for extracting said encapsulated point code and subsystem number from said return signal; and means for transmitting said return signal to said first node over said first SS7 network using said extracted point code and subsystem number as said called party address.

* * * * *